May 8, 1951  V. H. BROWN  2,552,253
ELECTRIC SOLDERING IRON
Filed Feb. 28, 1945
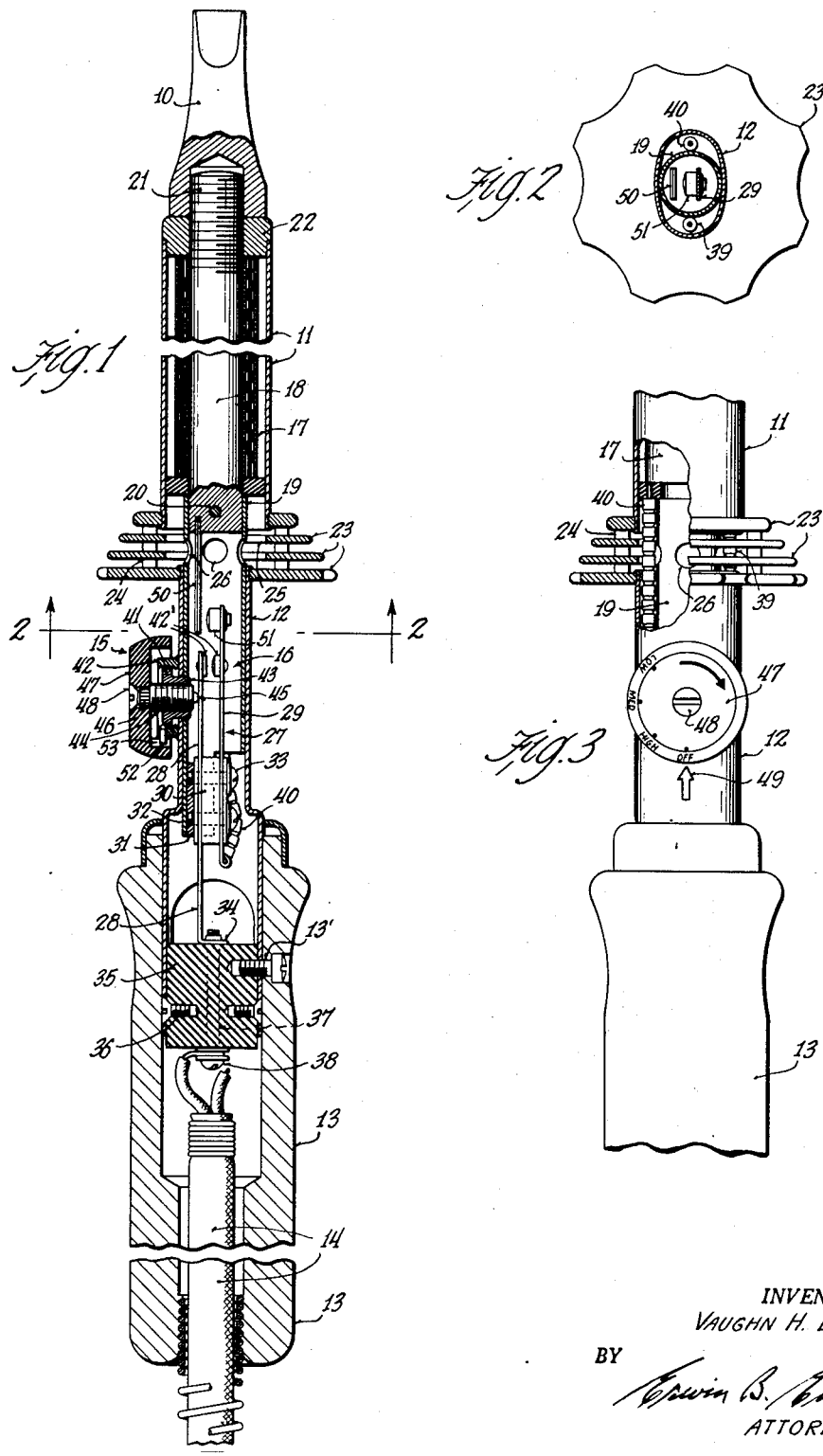
INVENTOR.
VAUGHN H. BROWN
BY
ATTORNEY Patented May 8, 1951

2,552,253

UNITED STATES PATENT OFFICE 2,552,253

ELECTRIC SOLDERING IRON

Vaughn H. Brown, Milwaukee, Wis.

Application February 28, 1945, Serial No. 580,135

9 Claims. (Cl. 219—26)

This invention relates to electric soldering irons and more particularly to irons that include an automatic temperature regulating device or thermostat including a switch and a control element, and a manually operable means for adjusting the operating position of the thermostat switch with respect to the control element which functions to normally maintain the soldering iron at a substantially uniform temperature in accordance with the setting of the manually operable means.

The general object of the present invention resides in the provision of a new and improved soldering iron embodying in a self-contained structure an automatic temperature regulating device, a manually operable regulating mechanism disposed for ready manipulating from the exterior of the structure for selectively varying the operating position of the automatic regulating device, and a control element operable to automatically maintain the desired operating temperature of the soldering iron in accordance with the setting of the regulating mechanism as dictated by the requirements of the particular work at hand.

Another object of the present invention resides in the provision of a new and improved soldering iron including a thermostat comprising a switch and a temperature responsive control element, adjusting means manually operable from the exterior of the iron and operative to establish the selected operating temperature of the soldering iron in accordance with visible temperature indicia on the adjusting means, by moving the switch with respect to the temperature responsive control means for effecting the automatic operation of the thermostat to maintain the soldering iron at a substantially uniform temperature in accordance with the positioning of the adjusting means.

Another object of the present invention resides in the provision of a new and improved soldering iron having a thermostat including a switch and a temperature responsive control element built into the iron and being provided with manually adjustable means operable from the exterior of the iron for varying the operating position of the thermostat switch with respect to the temperature responsive control element to automatically control the temperature of the iron in accordance with visible temperature indicia on the manually operable means.

Another object is to provide a new and improved soldering iron embodying structural features which materially improve the efficiency of the iron and reduce its cost of manufacture.

Another object is to provide a new and improved soldering iron having new and improved structural features which permit ready dismantling of the iron for service or repair.

Another object is to provide a self-contained soldering iron including visual means adapted for manual adjustment from the exterior of the iron for preselecting the temperature at which the iron may be maintained under the automatic operation of a thermostat.

According to this invention, a new and improved soldering iron has been provided which includes in a unitary structure a thermostat comprising a switch and a temperature responsive control element responsive to the temperature of the tip of the soldering iron and manually adjustable means positioned on the iron and disposed for ready manipulation from the exterior of the structure to provide a visual indication of the temperature at which the control element will break the switch contacts to maintain the tip of the soldering iron at a substantially uniform temperature in accordance with the setting of the manually operative means. The iron of the present invention is constructed in a manner to facilitate its manufacture and also provide means which are easily accessible to facilitate the repair or replacement of parts of the device which may show fatigue after long periods of service.

Other objects and advantages will become manifest from the following description of an illustrative embodiment of the present invention.

In the drawing:

Figure 1 is a longitudinal sectional view of a soldering iron constructed in accordance with the teachings of the present invention;

Figure 2 is a transverse sectional view taken on the line 2—2 of Fig. 1 and showing the relationship between the bi-metallic control element and the cooperating portion of a switch and also showing the disposition of the electrical conductors that feed current to the heating element; and Figure 3 is a fragmentary elevational view of a portion of the soldering iron looking from the left of Fig. 1 and showing a manually operable member for adjusting the operating position of the automatic temperature regulating device.

The electric soldering iron chosen for illustrative purposes in the acompanying drawing comprises generally a copper soldering tip 10, a head portion 11, a shank portion 12, a handle 13, and a conductor cord 14.

While the electric soldering iron of the present invention presents the general appearance of other implements of this nature, it will be noted that is embodies in a self-contained structure, a manually adjustable means 15 operative to effect the preselection of any temperature at which a thermostat 16 comprising a switch 27 and a temperature responsive control element 50 becomes effective to automatically maintain the soldering tip 10 at the desired operating temperature in accordance with the dictates of the position of the manually adjustable means 15.

The head 11 of the soldering iron comprises a hollow tubular member which forms a housing and an electrical heating element 17, of any desired form, that surrounds a copper rod or core 18 having its inner end secured within a tubular member or sleeve 19 by the application of an anchoring pin 20. The outer extremity of the core 18 is provided with threads 21 which serve to provide a mounting means for a closure 22 adapted to retain the electrical heating element 17 in proper position within the head portion 11 and also to provide a means for removably mounting the soldering tip 10 or other accessories, such as a solder pot.

For the purpose of dissipating the normal flow of heat from the head portion 11 to the handle 13 through the shank portion 12, a ventilating structure is included between the head portion 11 and the stem or shank portion 12. This ventilating mechanism includes a plurality of disc-like fins 23 retained in spaced relationship upon supporting pins 24. The outer fins 23 are secured respectively to the head portion 11 and shank portion 12 in any approved manner, such as by swaging. The intermediate fins 23 are provided with central apertures 25 disposed to receive the tubular member 19. For facilitating the dissipation of heat the tubular member 19 is provided with a series of holes 26 to materially reduce the amount of metal through which heat may be conducted from the copper core 18 to the shank portion 12 of the soldering iron.

The switch 27 of the thermostat 16 is housed within the tubular member 19 and comprises a pair of switch blades 28 and 29 mounted in parallel spaced relationship in an insulating block 30 adapted to be rigidly secured to a plate 31, preferably soldered in position on an extending portion 32 of the tube 19, by means of cap screws 33. The lower extremity of the switch blade 28 is provided with a flange 34 adapted to lie adjacent the upper face of a terminal block 35 fixedly mounted adjacent the lower extremity of the tubular shank portion 12 by the application of screws 36. The terminal block 36 is provided with a pair of axially disposed spaced bores 37 (one of which is shown) adapted to receive screws 38 which serve as terminals respectively for the conductor wires of the cord 14. The screws 38 shown in the drawing has its inner end in threaded engagement with the flange 34 of the switch blade 28. The other screw 38 (not shown) is connected at its inner end in a similar manner to a connector mounted on the end of a conductor wire 39 (see Fig. 2) and leads directly to one extremity of the coil of the heating element 17. The other end of the coil of the heating element 17 is connected through a conductor 40 to the base of the switch blade 29. The electrical circuit will be made or broken through a pair of contacts 42' disposed in co-operating relationship and mounted respectively on the blades 28 and 29.

After the conductor wires of the cord 14 have been attached to their respective terminal screw 38, the handle 13 may be slid over the end of the shank 12 and secured in proper position in any approved manner such as by the application of a screw 13' which passes through the wall of the shank 12 and is threadedly received in the terminal block 35.

It should be noted at this time that the tubular member 19 is circular in cross section and is adapted to be slidably received within the hollow tubular shank portion 12 which is oval in cross section to provide suitable space along either side of the tube 19 for the passage of the insulated conductors 39 and 40. The members 19 and 12 are releasably retained against relative movement by means of a screw plug 41 having one end thereof threaded in a boss 42 secured upon the outer surface of the shank portion 12. The inner end of the plug 41 is adaped to be received in an aperture 43 formed in the wall of the tubular member 19.

Manually operative means 15, in the form of the knob 47, is provided for adjusting the operating position of the switch 27 with respect to the bi-metal temperature responsive control element. This adjusting means comprises a screw 44 threadedly received in a bore extending axially through the screw plug 41. The inner end of the screw 44 is recessed to receive a pin 45, formed of insulating material, adapted to be moved into contact with the switch blade 28 to effect its displacement to move the contact 42' into electrical connection with the cooperating contact 42' carried by the blade 29. The outer extremity of the screw 44 is provided with a serrated head portion 46 adapted to slidably receive the serrated central aperture of an operating knob 47. The operating knob is releasably retained in proper angular position upon the head 46 by means of a screw 48. It will be noted that the operating knob 47 carries the visual indicia "off," "low," "medium," and "high," which serve to indicate either the position of the switch or the preselected temperature at which the iron is to be maintained through the automatic operation of the thermostat 16.

In order to insure proper adjustment of the control means with respect to the switch 27, the knob 47 is removed from the screw 44 and the screw 44 is turned to a position such that the contacts 42' are brought into electrical connection through the pressure of the pin 45 carried by the screw 44. The screw 44 is then backed off a sufficient distance to break the electrical contact. With the mechanism in this last mentioned position the knob 47 may be placed upon the serrated portion 46 of the screw 44 in such position that the word "off" lies substantially above an arrow or reference mark 49 formed on the oter surface of the shank portion 12. With the knob 47 in properly adjusted position, its rotation in a clock-wise direction (see Fig. 3) will result in the advance of the screw 44 to effect the initial closing of the electrical contacts 42' in the switch 27 and continued rotation of the knob in a clock-wise direction will effect the displacement of the switch blades 28 and 29 as a unit away from their normal vertical position. The degree of displacement will be visually indicated by the proximity of the marks "low," "medium," and "high" with respect to the arrow or mark 49.

The means for effecting the automatic operation of the switch 27 comprises a bi-metallic element 50 having one of its ends imbedded in the inner end of the copper core 18 which is directly connected at its other end with the soldering tip 10. As the temperature of the soldering tip 10 increases, the free end of the bi-metallic element 50 is deflected from its normal straight position until the amount of deflection caused by the heat of the core 18 and tip 10 is sufficient to bring the free end of the element 50 into pressure contact with an insulating button 51 mounted in any suitable manner upon the free end of the switch blade 29. The insulating button 51 is disposed to lie in the path of movement of the bi-metallic element 50. As the temperature of the tip 10 increases above that indicated by the position of the operating knob 47 the pressure of the free end of the bi-metallic element 50 against the button 51 will cause the switch blade 29 to be moved away from the cooperating blade 28 a sufficient distance to effect the breaking of the electrical connection between the contacts 42' and thus cut off the supply of electrical current to the heating element. This open condition of the contacts 42' will persist until such time as the temperature of the soldering tip 10 has reduced a sufficient amount to cause the bi-metallic element 50 to recede a sufficient distance to permit the reestablishment of electrical contact between the elements 42' at which time current will be reestablished through the heating element and effect an increase in the temperature of the soldering tip 10. Obviously, there is some time lag in the operation of the thermostat with the result that the temperature of the iron is maintained within a reasonable range of the selected temperature so that the range in temperature of the iron is constantly maintained within suitable operating limits.

Means is provided to insure the proper reading of the indicia on the operating knob 47 with the mark 49 by the inclusion of a stop mechanism operative to limit the mount of rotation of the knob 47 to a single turn. This means comprises a stop pin or similar abutment 52 which extends radially from the peripheral surface of the boss 42 and adapted for cooperation with a similar abutment 53 extending inwardly from the wall of a recess 54 formed in the inner surface of the operating knob 47.

It should be noted at this time that the above described structure is so constituted that it may readily be disassembled in an expeditious manner for the purpose of repair or replacement of worn parts. To effect the disassembly of the soldering iron, the screw for retaining the handle 13 in proper position upon the shank may be removed and the handle may be slid off the end of the shank 12. After the handle has been removed, the screws 38 are easily accessible and may be removed to disconnect the wires of the cord 14 from the terminal block 35. After this has been effected, the operating knob 47 may be removed from the end of the screw 44 and the screw plug 41 may then be removed to effect the disconnecting of the tubular member 19 from the shank 12. With the members 19 and 12 disconnected, the tip 10, core 18, tube 19, and switch 27 may be withdrawn as a unit from the head portion 11 of the soldering iron so as to render the various operating parts of the iron readily accessible for replacement or repair.

While the invention has been described in considerable detail in the foregoing specification, it will readily be understood that various changes may be made in its embodiment without departing from or sacrificing any of the advantages hereinafter claimed.

I claim:

1. In an electric soldering iron, the combination with a unitary structure including a heat conducting metal core, an electrical heating element surrounding said core, a soldering tip removably mounted on one end of said core, a thermostat switch supporting structure mounted on the other end of said core, and a thermostat mounted in said structure, said thermostat including a switch and a bi-metallic control element said switch being mounted remotely from said core and having a pair of blades directed toward said core, said bi-metallic control element having one end thereof thermally connected with said core and having its free end deflectable into contact with one of the blades of said switch, of a supporting structure for said unitary structure, said supporting structure including a head portion adapted to receive and house said heating element and core, a shank portion attached to said head portion and adapted to receive said thermostat switch supporting structure, a handle removably mounted on the shank portion, and a manually operable means mounted on said shank portion and adjustable to selectively vary the position of said switch with relation to said bi-metallic control element whereby the temperature of the iron may be automatically maintained in accordance with the selected setting of manually operable means.

2. In an electric soldering iron, the combination with a unitary structure including a heat conducting metal core, an electrical heating element surrounding said core, a soldering tip removably mounted on one end of said core, a thermostat switch supporting structure mounted on the other end of said core, and a thermostat mounted in said unitary structure, of a supporting structure for said unitary structure, said supporting structure including a head portion adapted to receive and house said heating element and core, a shank portion attached to said head portion and adapted to receive said thermostat switch supporting structure, a handle removably mounted on the shank portion, a manually operable means mounted on said shank portion adjustable to releasably retain said unitary structure in said supporting structure, and additional manually operable means supported by said first named means, said additional means serving to selectively adjust the operating position of said thermostat switch to vary the operating temperature of said soldering iron in accordance with the setting of said last named manually operable means.

3. In an electric soldering iron the combination with a unitary structure including a heat conducting core, an electrical heating element surrounding said core, a soldering tip on one end of said core, and an adjustable automatic temperature regulator comprising a thermostatic device including a bi-metallic temperature responsive control element thermally connected with said soldering tip and a switch mounted in said unitary structure remotely from said core and arranged for automatic operation under the influence of said temperature responsive control element, of a supporting structure for said unitary structure, said supporting structure including a head portion adapted to receive said heating element and said core, and a shank portion adapted to house said adjustable automatic temperature regulator, means for releasably securing said unitary structure in said supporting structure, and manually operable temperature regulating means disposed for ready manipulation from the exterior of said shank for adjusting the position of said switch with respect to said temperature responsive control element whereby said soldering tip is maintained at a substantially constant temperature as selected by the positioning of said manually operable temperature regulating means.

4. The combination with an electric soldering iron including a unitary structure comprising a soldering tip, a heating element, and an adjustable automatic temperature regulator comprising a thermostatic device including a temperature responsive control element thermally connected with said soldering tip, and a switch positioned remotely from said soldering tip and said heating element, said switch having a blade with its free end projecting toward the free end of said control element and disposed to lie in the path of deflection of said control element, of a supporting structure for said unitary structure, said supporting structure including a head portion adapted to receive and house said heating element, and a shank portion adapted to receive and house said adjustable automatic temperature regulator, anchoring means extending through said shank portion adapted to retain said unitary structure in fixed position within said supporting structure, and a manually adjustable knob projecting from said shank portion operatively associated with said switch to adjust the same with respect to said temperature control element, whereby said soldering tip is maintained at a substantially constant temperature as selected by the setting of said adjustable knob.

5. The combination with an electric soldering iron including a unitary structure comprising a soldering tip, a heating element, and a thermostatic device for regulating the operating temperature of said tip, said thermostatic device including a switch and a control element, said control element having one end thermally connected with said soldering tip and a free end directed toward said switch, said switch having a blade projecting toward said control element with its free end disposed in the path of deflection of said control element, of a supporting structure for said unitary structure, said supporting structure including a head portion, and a shank portion, means extending through the wall of said shank portion for retaining said unitary and supporting structure in fixed relationship, and a manually adjustable knob mechanism associated therewith extending through the wall of said shank for adjusting the operating position of said switch in relation to said control element, said control element being responsive to temperature changes of said tip for effecting the automatic operation of said switch, whereby said tip is maintained at a substantially uniform operating temperature as selected by the positioning of said knob.

6. The combination with an electric soldering iron including a unitary structure comprising a soldering tip, a heating element, and an adjustable automatic temperature regulator comprising a thermostatic device, said thermostatic device including a switch and a bi-metallic control element, of a supporting structure for said unitary structure, said supporting structure including a head portion and a shank portion, said head portion being adapted to receive and house said heating element, said shank portion being adapted to receive and house said adjustable automatic temperature regulator, anchoring means extending through the wall of said shank portion for releasably retaining said unitary structure in said supporting structure, and a manually operable means extending through said anchoring means for adjusting the operating position of said switch with respect to said bi-metallic control element, said bi-metallic element having one end thereof thermally connected with said soldering tip and having its free end deflectable in response to temperature changes in said soldering tip for effecting the automatic operation of said switch, whereby said soldering tip is maintained at a substantially constant temperature as selected by the positioning of said manually operable means.

7. The combination with an electric soldering iron including a unitary structure comprising a heat conducting metal core, an electrical heating element surrounding said core, a soldering tip mounted on one end of said core, a temperature responsive control element secured at the other end of said core, and a thermostat switch, of a supporting structure for said unitary structure, said supporting structure adapted to receive and house said core, heating element, control element and thermostat switch, anchoring means extending through the wall of said supporting structure in the proximity of said thermostat switch, and manually operable means extending through said anchoring means for adjusting the position of said thermostat switch with respect to said control element to select the desired temperature at which said soldering tip is maintained under the automatic operation of said control element.

8. The combination with an electric soldering iron including a unitary structure comprising a heat conducting metal core, an electrical heating element surrounding said core, a soldering tip mounted on one end of said core, a temperature responsive control element thermally connected to the other end of said core, and a switch arranged for automatic operation under the influence of said control element, of a supporting structure for said unitary structure, said supporting structure including a shank portion adapted to receive said temperature responsive control element and said switch of said unitary structure, anchoring means for retaining said unitary structure in said supporting structure, and manually operable means disposed in said shank portion for adjusting the position of said switch with respect to said control element, whereby the temperature of said soldering tip is maintained at a substantially constant temperature as selected by the adjusted position of said manually operable means.

9. The combination with an electric soldering iron including a unitary structure comprising a heat conducting metal core, an electrical heating element surrounding said core, a soldering tip mounted on one end of said core, a temperature responsive control element thermally connected to the other end of said core, and a switch arranged for automatic operation under the influence of said control element, of a supporting structure for said unitary structure, said supporting structure including a head portion adapted to receive and house said core and heating element of said unitary structure, and a shank portion adapted to receive and house said temperature responsive control element and said switch of said unitary structure, a handle removably mounted on said shank portion, anchoring means for releasably retaining said unitary structure in fixed position in said supporting structure, and a manually operable means on said shank portion disposed in operating relationship with said switch to adjust the position of the same with respect to said temperature responsive control element, whereby the desired operating temperature of the soldering iron may be adjusted at the will of the operator.

VAUGHN H. BROWN.

REFERENCES CITED

The following references are of record in the file of this patent:

UNITED STATES PATENTS

| Number | Name | Date |
|---|---|---|
| 1,478,319 | Young | Dec. 18, 1923 |
| 1,772,002 | Harper | Aug. 5, 1930 |
| 2,198,924 | Smith | Apr. 30, 1940 |
| 2,265,684 | Campbell | Dec. 9, 1941 |
| 2,341,831 | Vanatta | Feb. 15, 1944 |